(12) United States Patent
Ulrich et al.

(10) Patent No.: US 10,725,727 B2
(45) Date of Patent: Jul. 28, 2020

(54) DIGITAL EMULATION OF AN ANALOG DEVICE WITH TOLERANCE MODELING

(71) Applicant: Brainworx Audio GmbH, Leverkusen (DE)

(72) Inventors: Dirk Ulrich, Leichlingen (DE); Daniel Rabe, Leverkusen (DE); Reimund Dratwa, Düsseldorf (DE)

(73) Assignee: Brainworx Audio GmbH, Düsseldorf (DE)

( * ) Notice: Subject to any disclaimer, the term of this patent is extended or adjusted under 35 U.S.C. 154(b) by 564 days.

(21) Appl. No.: 15/253,408

(22) Filed: Aug. 31, 2016

(65) Prior Publication Data

US 2017/0060527 A1     Mar. 2, 2017

Related U.S. Application Data

(60) Provisional application No. 62/212,813, filed on Sep. 1, 2015.

(51) Int. Cl.
| | |
|---|---|
| *G06G 7/48* | (2006.01) |
| *G06F 3/16* | (2006.01) |
| *H04H 60/04* | (2008.01) |
| *G06F 3/0481* | (2013.01) |

(52) U.S. Cl.
CPC .............. *G06F 3/165* (2013.01); *H04H 60/04* (2013.01); *G06F 3/0481* (2013.01)

(58) Field of Classification Search
CPC ................................ H04H 60/04; G06F 3/165

USPC ............................................................ 703/4
See application file for complete search history.

(56) References Cited

U.S. PATENT DOCUMENTS

| | | | |
|---|---|---|---|
| 2006/0095888 A1* | 5/2006 | Li ....................... | G06F 17/5036 716/132 |
| 2015/0078584 A1* | 3/2015 | Moon ...................... | G10H 1/46 381/104 |
| 2015/0123721 A1* | 5/2015 | Midha ...................... | H03K 3/84 327/164 |
| 2016/0232266 A1* | 8/2016 | Rajagopalan ....... | G06F 17/5063 |

OTHER PUBLICATIONS

Michael B. Steer (Spice User's Guide and Reference, 308 pages (Year: 2007).*

* cited by examiner

*Primary Examiner* — Andre Pierre Louis (57) ABSTRACT

A digital emulation of an analog device with tolerance modeling is disclosed. In operation, a model of an analog circuit is provided. The model includes the location of each individual element in the analog circuit. The model also includes a working value for each individual element as well as a tolerance range for each individual element. A randomized working value is then generated for one or more of each individual element based on the tolerance range and the working value. A digital emulation of the analog circuit is performed. The digital emulation uses the randomized working value for one or more of the each individual element and the working value for any remaining of each individual element. The digital emulation is then provided to a user for use in a digital environment.

20 Claims, 6 Drawing Sheets

```
Models an analog circuit, the model provides a location of each
individual element in the analog circuit; provides a working value for
each individual element; and provides a tolerance range for each
individual element.
205
```
↓
```
Generates a randomized working value of one or more of each individual
element based on the tolerance range and the working value for one or
more of the each individual element in the analog circuit.
210
```
↓
```
Performs a digital emulation of the analog circuit, the digital emulation
utilizing the randomized working value for one or more of the each
individual element and the working value for any remaining of each
individual element.
215
```
↓
```
Provides the digital emulation to a user for use in a digital environment.
220
```

DIGITAL EMULATION OF AN ANALOG DEVICE WITH TOLERANCE MODELING

CROSS-REFERENCE TO RELATED APPLICATIONS (PROVISIONAL)

This application claims priority to and benefit of U.S. Provisional Patent Application No. 62/212,813 filed on Sep. 1, 2015, entitled "TOLERANCE MODELING" by Dirk Ulrich, and assigned to the assignee of the present application, the disclosure of which is hereby incorporated herein by reference in its entirety.

TECHNICAL FIELD

Examples described herein relate to digital emulation of an analog device.

BACKGROUND

Analog processors for audio recording are revered for their sound. As the audio recording process has moved to digital processors, many audiophiles feel that the digital processors are less "life" like and provide less depth. As such, they often prefer to use analog devices over digital processors to produce audio recordings.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description should not be understood as being drawn to scale unless specifically noted.

DETAILED DESCRIPTION

Reference will now be made in detail to embodiments of the subject matter, examples of which are illustrated in the accompanying drawings. While the subject matter discussed herein will be described in conjunction with various embodiments, it will be understood that they are not intended to limit the subject matter to these embodiments. On the contrary, the presented embodiments are intended to cover alternatives, modifications and equivalents, which may be included within the spirit and scope of the various embodiments as defined by the appended claims. Furthermore, in the Description, numerous specific details are set forth in order to provide a thorough understanding of embodiments of the present subject matter. However, embodiments may be practiced without these specific details. In other instances, well known methods, procedures, components, elements and circuits have not been described in detail as not to unnecessarily obscure aspects of the described embodiments.

Notation and Nomenclature

Unless specifically stated otherwise as apparent from the following discussions, it is appreciated that throughout the present Description of Embodiments, discussions utilizing terms such as "selecting", "outputting", "inputting", "providing", "receiving", "utilizing", "obtaining", "updating", "accessing", "changing", "correlating", "prescreening", "developing", "presenting", "deploying" or the like, often refer to the actions and processes of an electronic computing device/system, such as a desktop computer, notebook computer, tablet, mobile phone, and electronic personal display, among others. The electronic computing device/system manipulates and transforms data represented as physical (electronic) quantities within the circuits, electronic registers, memories, logic, and/or components and the like of the electronic computing device/system into other data similarly represented as physical quantities within the electronic computing device/system or other electronic computing devices/systems.

In the following discussion, it is understood that elements used in analog circuits all have a nominal value, a 5k resistor's nominal value is 5k, but in the real world these values vary based on a manufacturer's tolerances. By providing a digital emulation that includes modeling the element and including one or more element variations based on the tolerances, an "ideal" digital emulation is obtained as it is a more accurate representation of a real world example.

In the following discussion, the terms working value and randomized working value are utilized. Moreover, the term working value is broken down into a nominal working value and an actual working value.

For purposes of the discussion, nominal working value refers to the working value of the element as stated in the design. For example, if a 5k resistor is used in the design, the nominal working value would be exactly 5k.

In contrast, the actual working value refers to the actual value of the element that is found in the real world version of that analog device. For example, if a 5k resistor is to be used in the analog device, but when measured the resistor is actually operating at 5100 ohms, the actual working value for that specific resistor would be 5100 ohms.

The term randomized working value refers to the randomization discussed herein which is found by using the working value of the element in conjunction with the manufacturer stated tolerance range thereby resulting in randomized working value where element variations are included.

For purposes of the discussion, an analog circuit consists of a number of individual elements. The term elements refers to items such as a transistor, a capacitor, a resistor, an audio transformer, and the like. Moreover, the analog circuit may be one or more of a channel on a mixing console, an output bus on a mixing console, a mono hardware device (stand-alone or on the mixing console), a stereo hardware device (stand-alone or on the mixing console), an audio device used with a mixing console, or the like. In one embodiment, the modeling would also be applicable to analog devices which are totally separate from a mixing console which, while they are often used with a mixing console, do not require a mixer to be used in audio production.

Figure 1:
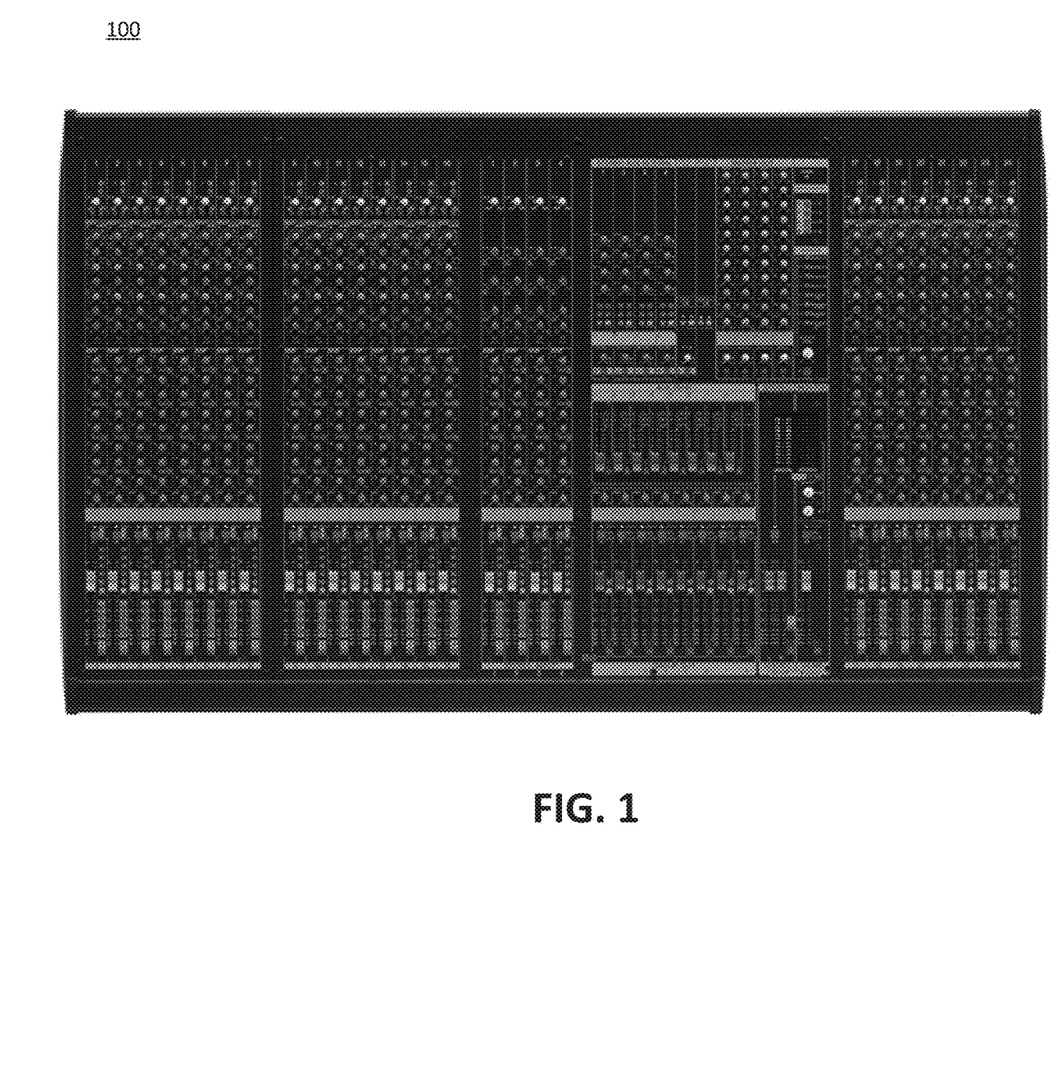
FIG. 1 is a diagram of an analog mixing console in accordance with an embodiment.

With reference now to FIG. 1, a diagram of an analog mixing console 100 is shown in accordance with an embodiment. In general, analog mixing console 100 is provided herein for purposes of clarity. That is, as an example of one of a plurality of possible types of analog devices that may be subject to digital emulation, such as, but not limited to, a channel on a mixing console, an output bus on a mixing console, a mono hardware device, a stereo hardware device, an audio device used with a mixing console, or the like. Moreover, it is well within the scope for the analog device to be of a different configuration or include more or fewer elements than that shown by analog mixing console 100. In one embodiment, the modeling would be applicable to devices which are totally separate from a mixing console which, while they are often used with a mixing console, do not require a mixer to be used in audio production.

Importantly, the embodiments discussed herein provide an approach for digital emulation of an analog device with tolerance modeling which differs significantly from the conventional processes. As will be described and explained below in detail, one embodiment provides a previously unknown procedure to model an analog circuit. Thus, embodiments of the present invention provide an approach for analog circuit modeling which extends well beyond what was previously done by hand.

As will be described in detail, the various embodiments of the present invention do not merely implement conventional analog circuit modeling processes on a computer. Instead, the various embodiments of the present invention, in part, provide a previously unknown procedure to model an analog circuit. Hence, embodiments of the present invention provide a novel process for analog circuit modeling which is necessarily rooted in computer technology to overcome a problem specifically arising in the realm of analog circuit modeling.

Moreover, the embodiments do not recite a mathematical algorithm; nor do they recite a fundamental economic or longstanding commercial practice. Instead, they address a challenge of accurate analog circuit modeling. Thus, the embodiments do not "merely recite the performance of some business practice known from the pre-Internet world along with the requirement to perform it on the Internet." Instead, the embodiments are necessarily rooted in analog to digital technology in order to overcome a problem specifically arising in the realm of analog circuit modeling.

Figure 2:
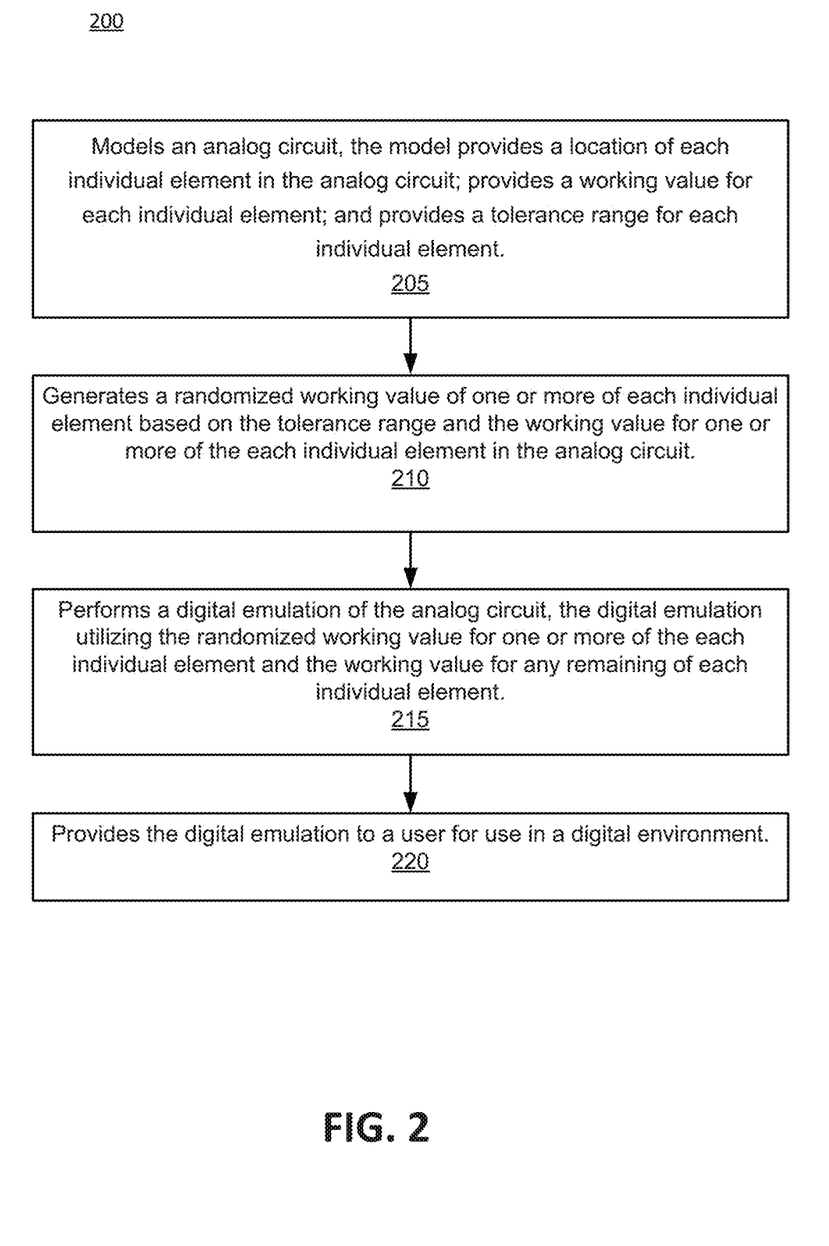
FIG. 2 is a flowchart of a method for digital emulation of an analog device with tolerance modeling, in accordance with an embodiment.

With reference now to FIG. 2 is a flowchart 200 of a method for digital emulation of an analog device with tolerance modeling shown in accordance with an embodiment. In general, while variation in analog elements is a fact of life when designing and manufacturing analog equipment, element tolerances have not been included in these software models of analog circuits either because they are considered to be an imperfection in need of correction or considered too complex a problem to solve.

While analog designers over the last 50 years have strived to come up with designs which are less prone to these tolerances—mainly capacitor and resistor deviation—these variations still exist and have an effect on the audio performance of the device. This is evident in the existence of "golden units" where audio professionals find a particular example of a unit which performs better than other examples of the same model and vintage. Audio professionals also find that they like a particular unit for a particular task. For example, they may like the way one particular unit sounds on drums and the way another sounds on vocals, so these element differences are not only quantitative, but qualitative.

The sonic difference element tolerances make is perhaps most obvious in a large audio mixer that could have up to 100 analog channels which are built at the same time from the same stock of elements yet exhibit sonic differences. Again, audio professionals will often prefer one channel for one type of audio signal and another channel for another type.

In general, resistors and capacitors are the elements which most affect the signal and while resistor tolerance can be quite low, typically in the range of <=1%, when it comes to critical parts of the circuit this is enough to affect the audio signal. With some types of capacitors the tolerance can be quite high, up to 10 or even 20% around the nominal value. It's hard to quantify the impact of such tolerances since it highly depends on different factors such as the type of circuit, the amount of involved elements, the operating temperature, humidity etc. It is clear from the preferences audio professionals have for certain units, that these differences can be important sonically. In addition, it is clear that certain things, like the influence on e.g. the cut-off frequency of an RC-type filter is undeniable, and would likely have an audible sonic influence.

An approach often used by more sophisticated analog modeling developers is to find one of these "golden units" and use it as the basis for their software model. This method does not address element tolerances at all, but rather simply models a unit where these tolerances were deemed pleasing. Effectively this means that all element tolerances in that unit are captured by adjusting a physical model to the nominal values that can be measured in the circuit of that particular unit. Accordingly, a well-designed simulation obtained through this method will resemble the sound of that fixed golden unit at all settings. The technology further captures the mentioned element tolerances so a realistic inter-unit variance with all the involved sonic effects becomes available, e.g. to mimic the different channels of an analog mixing desk or the unit to unit variation of stand-alone audio processors.

Embodiments described herein, use a single model for a given circuit to be emulated, but use different instances of that model where all the relevant physical quantities (resistances and capacitance) are randomized. This randomization is done in a way so that the obtained values resemble the distribution a randomly chosen set of resistors and/or capacitors would exhibit based on the stated tolerance range of the element or by the element manufacturer. In one embodiment, the obtained series of quantities is reproducible.

Embodiments described herein are directly against both current industry trends and the fundamental nature of digital. Current analog modeling technology providers view element tolerance as a negative attribute and use digital modeling to eliminate it by precisely modeling the specific collection of elements found in an individual unit which has been deemed to be pleasing; also known as a "golden unit." Embodiments described herein, go in the other direction by accurately emulating the unit to unit variation found in the original analog units. As a result, a number of benefits are realized. For example, when more than one instance of a particular emulation is used simultaneously, realism is increased. Moreover, it becomes possible to create variations which are pleasing when used for different applications. That is, a golden unit for vocals and another one for drums, for example.

Referring again to FIG. 2, at 205 one embodiment models an analog circuit. In general, an analog circuit consists of a number of individual elements such as a transistor, a capacitor, a resistor, an audio transformer, and the like. Moreover, the analog circuit may be one or more of a channel on a mixing console, an output bus on a mixing console, a mono hardware device, a stereo hardware device, an audio device used with a mixing console, or the like. In one embodiment, the modeling would be applicable to devices which are totally separate from a mixing console which, while they are often used with a mixing console, do not require a mixer to be used in audio production.

For example, a mixing console may have a bunch of individual channels to plug in microphones, instruments, and the like. Moreover, many channels may be used all at once and could be combined together in the mixing console and sent to the tape machine. Further, an analog mixing console might have 100-200 individual elements per channel.

The model provides a location of each individual element in the analog circuit. In addition, the model provides a working value for each individual element. In one embodiment, the working value is a nominal working value, e.g., the value defined in the original design schematic e.g., a 5k Ohm resistor. In another embodiment, the working value is an actual working value. That is, the value is determined by evaluating each element of an analog channel to measure its actual working value; e.g., resistor 27 has an actual resistance of 134 ohms, capacitor 39 has an actual capacitance of 22 microfarad, etc. In one embodiment, the model also provides a tolerance range for each individual element. For example, when the parts were manufactured, they were made to operate within a tolerance range, e.g., ±5%. The tolerance may be based on a manufacturer's specification, a marking on the element, or the like.

In one embodiment, after the model is created, an exact specification digital emulation of the analog circuit may be built. That is, the exact specification digital emulation will use the working value of each individual element to make the digital emulation.

Figure 3:
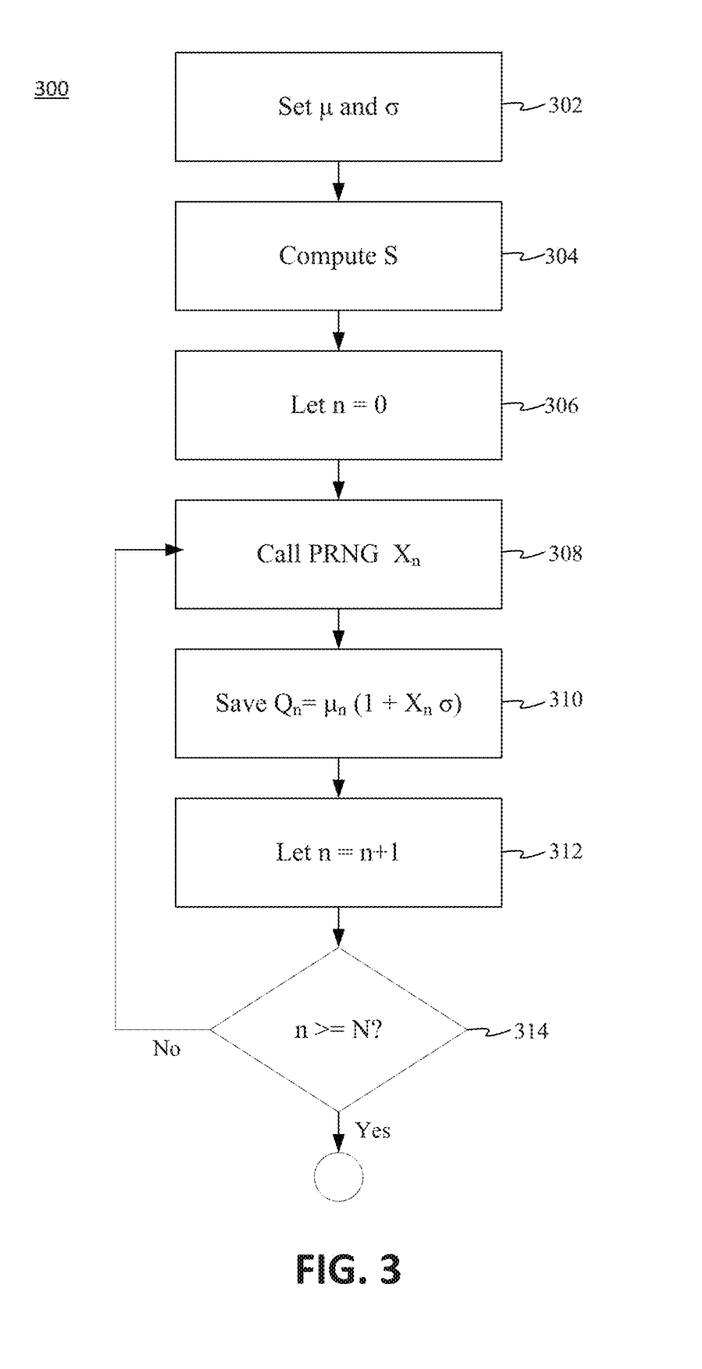
FIG. 3 is a flow chart of a method for randomizing a working value of one or more of each individual element in an analog device, in accordance with an embodiment.

With reference now to 210 of FIG. 2 and FIG. 3, one embodiment generates a randomized working value of one or more of each individual element based on the element manufacturer's stated tolerance range and utilizes the working value for the rest of the one or more of the each individual element in the analog circuit. For example, the tolerances are utilized to provide a digital channel model of an analog channel that is not only based on the individual elements within the channel but also emulates the variations that are possible for a given analog channel based on the tolerances of the individual elements that make up the analog channel. In other words, randomized working value is the nominal value of an element modified based on the expected variation of the element.

For example, at one point the ninth resistor in golden channel 1 provides a resistance of 2000 ohms. But in a different channel, e.g., channel 2, built with the exact same type of individual elements and layout as golden channel 1, the channel 2 ninth resistor provides a resistance of 2050 ohms. In other words, between similarly built analog channels there can be minor variations in channel output as one or more of the individual elements in the different channels would likely operate with minor variation while remaining within their tolerance ranges.

As such, one embodiment, as described herein, provides a digital emulation of an analog channel that not only emulates the channel at an individual element level, but additionally provides random variation within the tolerance range to one or more of the emulated individual elements within the channel. Thus, when building a digital emulation of a 72 channel mixing board, instead of providing 72 digital emulations of the exact same analog channel; one embodiment provides 72 varied digital emulation channels, each channel being a different digital emulation of the exact same analog channel with one or more of the individual element in each of the channels operating at a slightly different (but within tolerances) value.

In one embodiment the channel generation is randomized during development, and then fixed in the software that is provided to a user. In so doing, the actual output of the digital mixing board would more closely mimic, or emulate, an actual analog mixing board.

Referring now to FIG. 3, a flowchart 300 of a method for randomizing a working value of one or more of each individual element in an analog device, in accordance with an embodiment. In general, this method is performed by a device such as a randomized working value generator.

With reference to 302 of FIG. 3, one embodiment sets $\mu$ and $\sigma$. For purposes of the discussion, $\mu$ and $\sigma$ describe a normal distribution in statistics. Here, $\mu$ represents the nominal element value and $\sigma$ the element manufacturer's stated tolerance. For example, a 5k Ohm resistor with a tolerance of 10% would result in $\mu$=5000 and $\sigma$ set to a value that represents 10%.

Referring now to 304 of FIG. 3, one embodiment computes S. The goal is to produce random values that are reproducible and statistically independent. A well-known concept to realize the former is a seed value S. Seeds in informatics simply mean initial value to an algorithm. Using the initial value with a side effect-free algorithm gives the same output every time.

For example, S is used as the seed value to a normally distributed pseudo random number generator (PRNG). Several realizations for normally distributed PRNGs exists (e.g. Central Limit Theorem Approximation, Box-Muller Method, Polar Method, etc.). The 64 bit IEEE double representation of $\mu$ is transformed into a 32 bit word by exclusively or'ing its high and low word. The resulting value is called S.

Referring now to 306 of FIG. 3, one embodiment lets n=0. Where n is an index that counts the number of processed values. In one embodiment, the tolerance values should be statistically independent, meaning it shouldn't be distinguishable from random values that are created in natural or technical processes. This is realized by so-called pseudo random number generators. One embodiment, implements the Central Limit Theorem approximation which results in normally distributed, statistically independent values. In so doing, it makes the series generated in 308-314 depend on $\mu$ and reproducible.

With reference now to 308 of FIG. 3, one embodiment draws a sample $X_n$ from a N(0,1) distributed population using PRNG.

Referring now to 310 of FIG. 3, in one embodiment $Q_n = \mu + d$ is the final random quantity used to resemble the variation; e.g. a resistance out of a series of resistors. To find $Q_n$ one would need to compute the distribution $d_n = X_n \sigma \mu$.

This can be solved by substituting $d_n = X_n \sigma \mu$ into $Q_n = \mu + d$ to arrive at:

$$Q_n = \mu + X_n \sigma \mu$$

$$Q_n = \mu(1 + X_n \sigma)$$

Referring now to 312 of FIG. 3, one embodiment Lets n=n+1. That is, the n value is incremented by 1. For example, if a given circuit has 25 hardware realizations, then there would need to be 25 Q values. The incrementing of n is used in decision block 314 to make sure the appropriate number of Q values is obtained.

With reference now to 314 of FIG. 3, one embodiment evaluates at decision block n>=N. Where N represents the number of instances. For example, a given circuit has 16 hardware realizations. Letting N=16, the algorithm would then produce a list of 16 Q values for a given nominal element value and the manufacturer's stated tolerance. In other words, 308-312 would be repeated N times to obtain a series of N pseudo random quantities $Q_n$.

Referring again to FIG. 2 and FIG. 4, at 215 one embodiment performs a digital emulation of the analog circuit, the digital emulation utilizing the randomized working value for one or more of each individual element and the working value for any remaining of each individual element. That is, use the series $Q_n$ for every quantity to be randomized and feed them into the model instance $M_n$ to obtain various instances that resemble the inter-unit deviation that would be encountered in a real world scenario for $n^{th}$ digital emulation number of instances.

Figure 4:
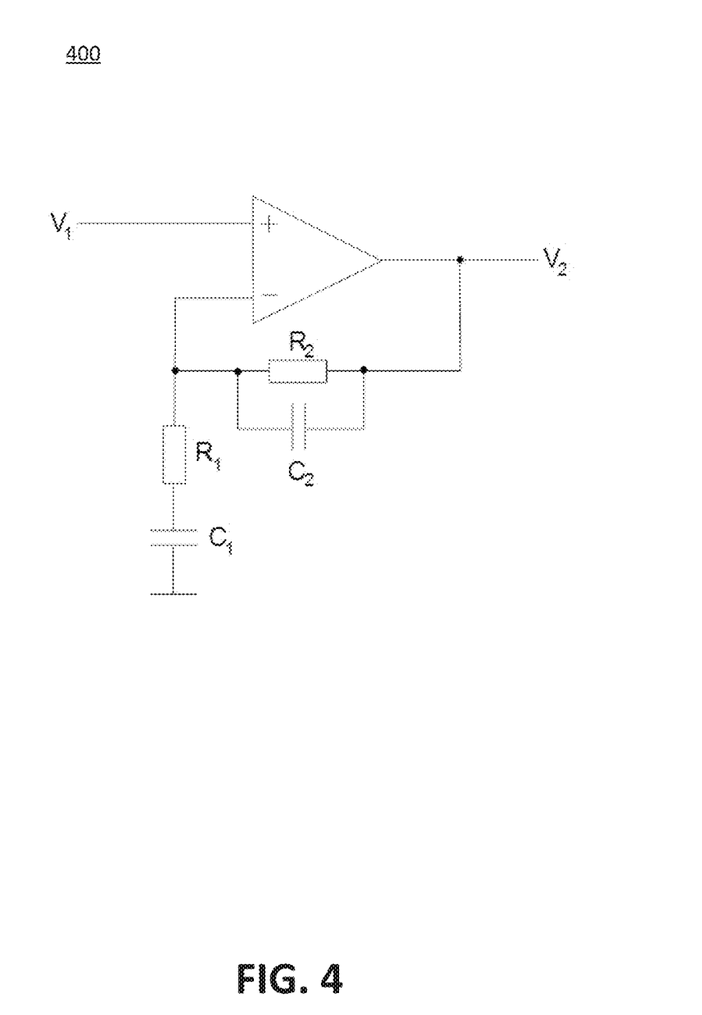
FIG. 4 is a diagram of a non-inverting Op-amp topology, in accordance with an embodiment.

With reference now to FIG. 4, a diagram of a standard $2^{nd}$ order peaking filter that is implemented using a non-inverting Op-amp 400 topology is shown in accordance with an embodiment. In the following discussion, the Op-amp 400 will be treated as ideal. The parameters of the system are the two resistances $r_1$ and $r_2$ and the two capacitances $c_1$ and $c_2$. Let $M_n = \{r_1^{(n)}, r_2^{(n)}, c_1^{(n)}, c_2(n)\}$ be the series of model instances to be randomized.

The transfer function of the system is given as:

Transfer function $$H(j\omega) = \frac{\omega_c^2 \Box q + \omega_c \Box g \Box j\omega + q\Box(j\omega)^2}{\omega_c^2 \Box q + \omega_c \Box j\omega + q\Box(j\omega)^2}. \quad (4.1)$$

With the parameters given as, $$\text{Cut-off frequency } \omega_c = \frac{\sqrt{r_2 \Box c_2 \Box r_1 \Box c_1}}{r_2 \Box c_2 \Box r_1 \Box c_1}. \quad (4.2)$$

$$\text{Gain } g = \frac{c_1 \Box r_2 + r_2 \Box c_2 + r_1 \Box c_1}{r_2 \Box c_2 + r_1 \Box c_1}. \quad (4.3)$$

$$Q\text{-factor } q = \frac{1}{\omega_c \Box (r_2 \Box c_2 + r_1 \Box c_1)}. \quad (4.4)$$

The system can be discretized using standard techniques such as a bilinear transform or the like. Discretization of the considered system involves plugging the 3 input parameters $\psi_c$, g and q resulting from one instance of $M_n$, applied to formula (4.2) thru (4.4) into a digital filter prototype that reproduces its analog counterpart $H(j\omega)$.

Figure 5:
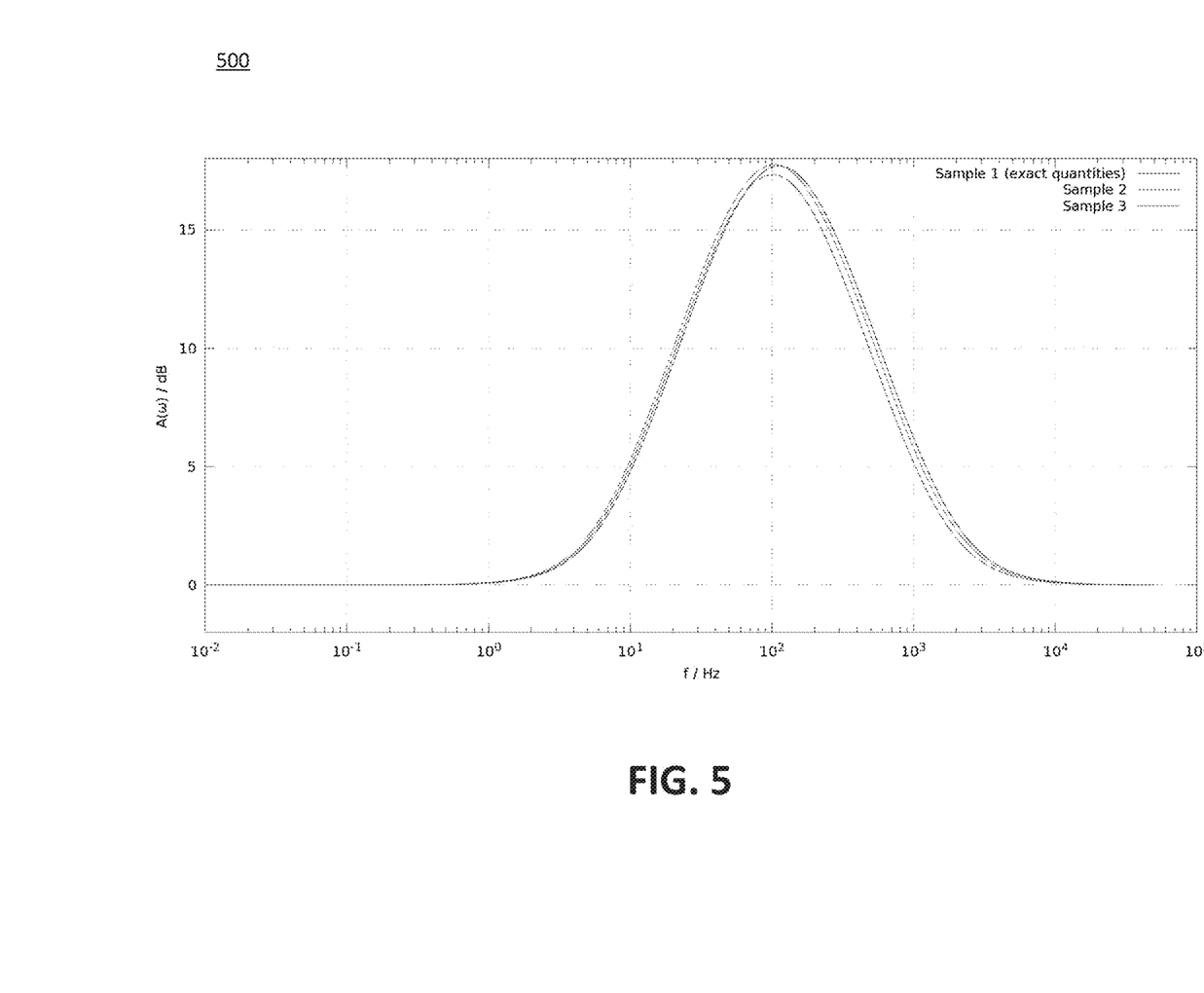
FIG. 5 is a graph showing the resulting frequency responses for 3 samples of the peaking filter that result from the digital emulation of an analog device with tolerance modeling, in accordance with an embodiment.

With reference now to FIG. 5, a graph 500 showing the resulting frequency responses for 3 samples of the peaking filter that result from the digital emulation of an analog device with tolerance modeling is shown in accordance with an embodiment. For example, graph 500 shows the resulting frequency responses for 3 samples of the peaking filter that results from the quantities:

$r_1$=1 KΩ (1% tolerance)

$r_2$=10 KΩ (1% tolerance)

$c_1$=2 μF (10% tolerance)

$c_2$=1 μF (10% tolerance)

With reference again to FIG. 2 and now to 220, one embodiment provides the digital emulation to a user for use in a digital environment. In other words, once the digital emulation is complete, it is fixed into a digital format to be presented on a graphical user interface to a user and to be used in the same manner in which the modeled analog device was utilized. In other words, if the digital emulation is of an audio mixer, the digital audio mixer would be a software program that is operational on a computer system to act as an audio mixer.

Example Computer System Environment

Figure 6:
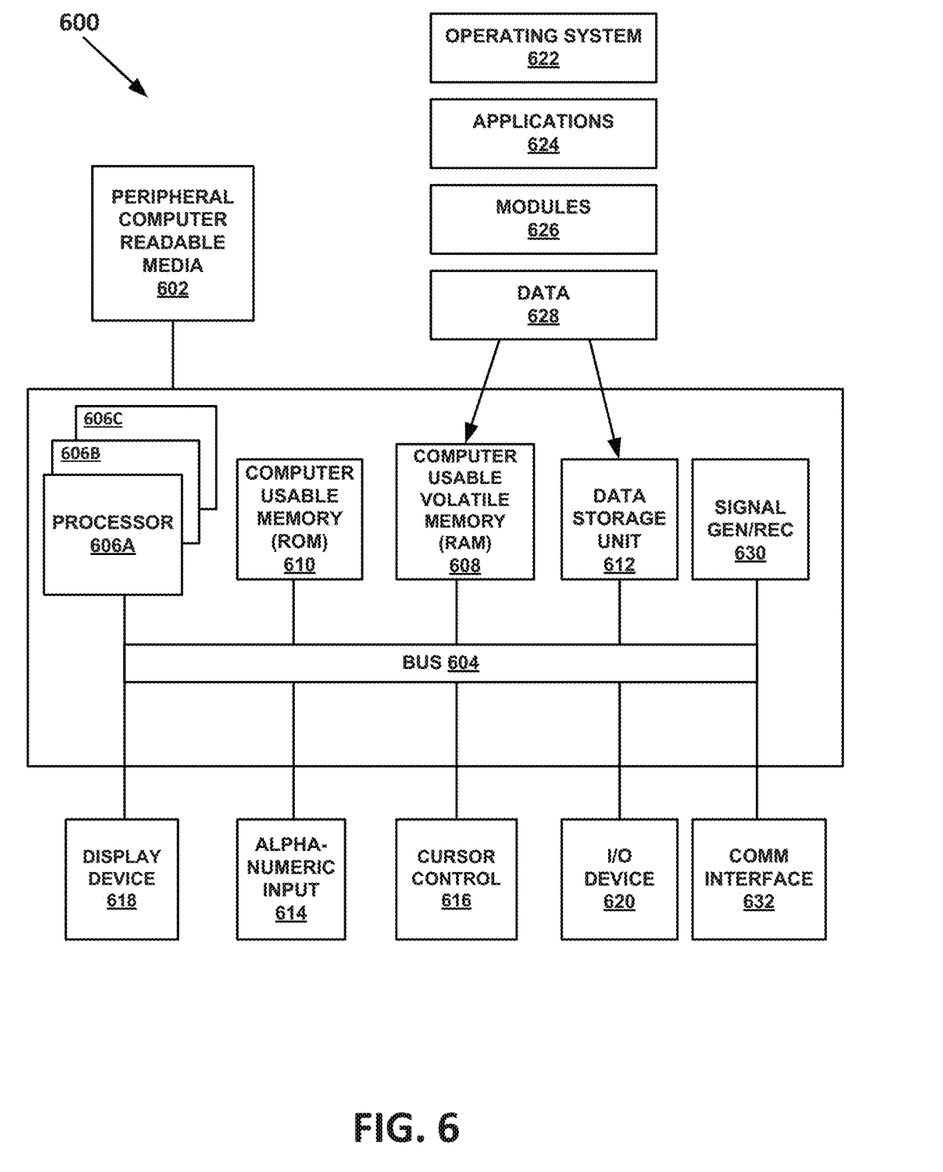
FIG. 6 is a block diagram of an example computer system with which or upon which various embodiments of the present invention may be implemented.

With reference now to FIG. 6, portions of the technology for providing a communication composed of computer-readable and computer-executable instructions that reside, for example, in a non-transitory computer-readable medium of a computer system. That is, FIG. 6 illustrates one example of a type of computer that can be used to implement embodiments of the present technology. FIG. 6 represents a system or components that may be used in conjunction with aspects of the present technology. In one embodiment, some or all of the components described herein may be combined with some or all of the components of FIG. 6 to practice the present technology.

FIG. 6 illustrates an example computer system 600 used in accordance with embodiments of the present technology. It is appreciated that system 600 of FIG. 6 is an example only and that the present technology can operate on or within a number of different computer systems including general purpose networked computer systems, embedded computer systems, routers, switches, server devices, user devices, various intermediate devices/artifacts, stand-alone computer systems, mobile phones, personal data assistants, televisions and the like. As shown in FIG. 6, computer system 600 of FIG. 6 is well adapted to having peripheral computer readable media 602 such as, for example, a disk, a compact disc, a flash drive, and the like coupled thereto.

Computer system 600 of FIG. 6 includes an address/data/control bus 604 for communicating information, and a processor 606A coupled to bus 604 for processing information and instructions. As depicted in FIG. 6, system 600 is also well suited to a multi-processor environment in which a plurality of processors 606A, 606B, and 606C are present. Conversely, system 600 is also well suited to having a single processor such as, for example, processor 606A. Processors 606A, 606B, and 606C may be any of various types of microprocessors. Computer system 600 also includes data storage features such as a computer usable volatile memory 608, e.g., random access memory (RAM), coupled to bus 604 for storing information and instructions for processors 606A, 606B, and 606C.

System 600 also includes computer usable non-volatile memory 610, e.g., read only memory (ROM), coupled to bus 604 for storing static information and instructions for processors 606A, 606B, and 606C. Also present in system 600 is a data storage unit 612 (e.g., a magnetic disk drive, optical disk drive, solid state drive (SSD), and the like) coupled to bus 604 for storing information and instructions. Computer system 600 also includes an optional alpha-numeric input device 614 including alphanumeric and function keys coupled to bus 604 for communicating information and command selections to processor 606A or processors 606A, 606B, and 606C. Computer system 600 also includes an optional cursor control device 616 coupled to bus 604 for communicating user input information and command selections to processor 606A or processors 606A, 606B, and 606C. Optional cursor control device may be a touch sensor, gesture recognition device, and the like. Computer system 600 of the present embodiment also includes an optional display device 618 coupled to bus 604 for displaying information.

Referring still to FIG. 6, optional display device 618 of FIG. 6 may be a liquid crystal device, cathode ray tube, OLED, plasma display device or other display device suitable for creating graphic images and alpha-numeric characters recognizable to a user. Optional cursor control device 616 allows the computer user to dynamically signal the movement of a visible symbol (cursor) on a display screen of display device 618. Many implementations of cursor control device 616 are known in the art including a trackball, mouse, touch pad, joystick, non-contact input, gesture recognition, voice commands, bio recognition, and the like. In addition, special keys on alpha-numeric input device 614 capable of signaling movement of a given direction or manner of displacement. Alternatively, it will be appreciated that a cursor can be directed and/or activated via input from alpha-numeric input device 614 using special keys and key sequence commands.

System 600 is also well suited to having a cursor directed by other means such as, for example, voice commands. Computer system 600 also includes an I/O device 620 for coupling system 600 with external entities. For example, in one embodiment, I/O device 620 is a modem for enabling wired or wireless communications between system 600 and an external network such as, but not limited to, the Internet or intranet. A more detailed discussion of the present technology is found below.

Referring still to FIG. 6, various other components are depicted for system 600. Specifically, when present, an operating system 622, applications 624, modules 626, and data 628 are shown as typically residing in one or some combination of computer usable volatile memory 608, e.g. random access memory (RAM), and data storage unit 612. However, it is appreciated that in some embodiments, operating system 622 may be stored in other locations such as on a network or on a flash drive; and that further, operating system 622 may be accessed from a remote location via, for example, a coupling to the internet. In one embodiment, the present technology, for example, is stored as an application 624 or module 626 in memory locations within RAM 608 and memory areas within data storage unit 612. The present technology may be applied to one or more elements of described system 600.

System 600 also includes one or more signal generating and receiving device(s) 630 coupled with bus 604 for enabling system 600 to interface with other electronic devices and computer systems. Signal generating and receiving device(s) 630 of the present embodiment may include wired serial adaptors, modems, and network adaptors, wireless modems, and wireless network adaptors, and other such communication technology. The signal generating and receiving device(s) 630 may work in conjunction with one or more communication interface(s) 632 for coupling information to and/or from system 600. Communication interface 632 may include a serial port, parallel port, Universal Serial Bus (USB), Ethernet port, Bluetooth, thunderbolt, near field communications port, WiFi, Cellular modem, or other input/output interface. Communication interface 632 may physically, electrically, optically, or wirelessly (e.g., via radio frequency) couple computer system 600 with another device, such as a mobile phone, radio, or computer system.

The computing system 600 is only one example of a suitable computing environment and is not intended to suggest any limitation as to the scope of use or functionality of the present technology. Neither should the computing environment be interpreted as having any dependency or requirement relating to any one or combination of components illustrated in the example computing system 600.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

Code Example

```
% Tolerance Modeling Example (MATLAB)
function tmt( )
    % Example elements for 2nd order peaking filter
    r1 = 1e3;
    r2 = 1e4;
    c1 = 2e-6;
    c2 = 0e-6;
    % Compute 3 sample TMT series (metal film resistors with
    1% tolerance,
    % foil capacitors with 10% tolerance)
    r1s = [rndQuantity(r1, 0.0), rndQuantity(r1, 0.01),
    rndQuantity(r1, 0.01)];
    r2s = [rndQuantity(r2, 0.0), rndQuantity(r2, 0.01),
    rndQuantity(r2, 0.01)];
    c1s = [rndQuantity(c1, 0.0), rndQuantity(c1, 0.10),
    rndQuantity(c1, 0.10)];
    c2s = [rndQuantity(c2, 0.0), rndQuantity(c2, 0.10),
    rndQuantity(c2, 0.10)];
    % Compute transfer functions
    [A1, f] = tf(r1s(1), r2s(1), c1s(1), c2s(1));
    [A2, ~] = tf(r1s(2), r2s(2), c1s(2), c2s(2));
    [A3, ~] = tf(r1s(3), r2s(3), c1s(3), c2s(3));
    close all
    semilogx(f, A1, f, A2, f, A3);
    title('Tolerance Modeling Technology - Application Example')
    ylabel('A(\omega) / dB');
    xlabel('f / Hz');
    legend('Sample 1 (exact quantities)', 'Sample 2', 'Sample 3')
    grid on;
end
```

Code Example 2

```
% Compute transfer function of 2nd order peaking filter
%
function [A, f]=tf(r1, r2, c1, c2)
    f=10.^[-2:0.01:log10(50.e3)];
    wc = sqrt(r2 * c2 * r1 * c1) / (r2 * c2 * r1 * c1);
    g = (c1 * r2 + r2 * c2 + r1 * c1) / (r2 * c2 + r1 * c1);
    q = 1.0 / (wc * (r2 * c2 + r1 * c1));
    b0 = wc^2 * q;
    b1 = wc * g;
    b2 = q;
    a0 = wc^2 * q;
    a1 = wc;
    a2 = q;
    s = 2*pi*j*f;
    H = (b0 + b1 * s + b2 * s.^2) ./ (a0 + a1 * s + a2 * s.^2);
    A = 20*log10(abs(H));
end
```

Code Example 3

```
% Return random quantity matching the given tolerance
% criteria
%
function [q] = rndQuantity(mu, sigma)
    x = randn( );
    d = x * sigma;
    q = mu * (1 + d);
end
```

The foregoing Description is not intended to be exhaustive or to limit the embodiments to the precise form described. Instead, example embodiments in this Description have been presented in order to enable persons of skill in the art to make and use embodiments of the described subject matter. Moreover, various embodiments have been described in various combinations. However, any two or more embodiments may be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What we claim is:

1. A digital emulation of an analog device with tolerance modeling comprising:
    a model of an analog circuit, the model comprising:
        a location of each individual element in said analog circuit;
        a working value for each individual element; and
        a tolerance range for each individual element;
    a randomized working value generator to generate a randomized working value for one or more of each individual element based on the tolerance range and the working value;
    a real time digital emulator to provide a digital emulation of the analog circuit, the real time digital emulator utilizing the randomized working value for one or more of said each individual element and the working value for any remaining of each individual element; and
    a graphical user interface to present the digital emulation to a user for use in a digital environment.

2. The digital emulation of claim 1, further comprising:
    the randomized working value generator to generate an $n^{th}$ randomized working value for one or more of each individual element based on the tolerance range and the working value; the digital emulator to provide an $n^{th}$ digital emulation of the analog circuit, the $n^{th}$ digital emulation uses the $n^{th}$ randomized working value for one or more of said each individual element and the working value for any remaining of each individual element; and
    the digital emulation presenter to present the $n^{th}$ digital emulation to the user.

3. The digital emulation of claim 1, wherein the analog circuit is a channel on a mixing console.

4. The digital emulation of claim 1, wherein the analog circuit is an output bus on a mixing console.

5. The digital emulation of claim 1, wherein the analog circuit is a mono or a stereo hardware device.

6. The digital emulation of claim 1, wherein the analog circuit is an audio device used with a mixing console.

7. The digital emulation of claim 1, wherein each individual element is selected from the group consisting of a transistor, a capacitor, a resistor, and an audio transformer.

8. A method for digital emulation of an analog device with tolerance modeling, said method comprising:
    modeling an analog circuit, the modeling comprising:
        providing a location of each individual element in said analog circuit;
        providing a working value for each individual element; and
        providing a tolerance range for each individual element;
    generates a randomized working value of one or more of each individual element based on the tolerance range and the working value for one or more of said each individual element in the analog circuit;
    performing a real time digital emulation of the analog circuit, the real time digital emulation utilizing the randomized working value for one or more of said each individual element and the working value for any remaining of each individual element; and
    providing the digital emulation to a user for use in a digital environment.

9. The method of claim 8, further comprising:
    generating an $n^{th}$ randomized working value for one or more of each individual element based on the tolerance range and the working value;
    performing an $n^{th}$ digital emulation of the analog circuit, the $n^{th}$ digital emulation using the $n^{th}$ randomized working value for one or more of said each individual element and the working value for any remaining of each individual element; and
    providing the $n^{th}$ digital emulation to the user for use in the digital environment.

10. The method of claim 8, wherein the analog circuit is a channel on a mixing console.

11. The method of claim 8, wherein the analog circuit is an output bus on a mixing console.

12. The method of claim 8, wherein the analog circuit is a mono or a stereo hardware device.

13. The method of claim 8, wherein the analog circuit is an audio device used with a mixing console.

14. The method of claim 8, wherein each individual element is selected from the group consisting of a transistor, a capacitor, a resistor, and an audio transformer.

15. A non-transitory computer-readable medium storing instructions, the instructions comprising:
    one or more instructions that, when executed by one or more processors of a device, cause the one or more processors to:
        receive a model that identifies each individual element of an analog circuit, the model comprising:
            a location of each individual element in said analog circuit;
            a working value for each individual element; and
            a tolerance range for each individual element;
        perform a first real time digital emulation of the analog circuit, the first real time digital emulation uses the working value for each individual element;
        randomize a working value of one or more of each individual element based on the tolerance range for each individual element to provide a randomized working value that is different from the working value for one or more of said each individual element in the analog circuit;
        perform a real time second digital emulation of the analog circuit, the second real time digital emulation uses the randomized working value for one or more of said each individual element; and provide the first real time digital emulation and the second real time digital emulation to a user for use in a digital environment.

16. The non-transitory computer-readable medium of claim 15, where the one or more instructions further comprise instructions to:

randomize the working value of one or more of each individual element based on the tolerance range for each individual element in times to provide an $n^{th}$ randomized working value that is different from the working value for one or more of said each individual element in the analog circuit;

perform an $n^{th}$ digital emulation of the analog circuit, the $n^{th}$ digital emulation uses the $n^{th}$ randomized working value for one or more of said each individual element; and provide the $n^{th}$ digital emulation to the user for use in the digital environment.

17. The non-transitory computer-readable medium of claim 15, wherein the analog circuit is a channel on a mixing console.

18. The non-transitory computer-readable medium of claim 15, wherein the analog circuit is an output bus on a mixing console.

19. The non-transitory computer-readable medium of claim 15, wherein the analog circuit is a mono or a stereo hardware device on a mixing console.

20. The non-transitory computer-readable medium of claim 15, wherein each individual element is selected from the group consisting of a transistor, a capacitor, a resistor, and an audio transformer.

* * * * *